(12) United States Patent
Crankshaw et al.

(10) Patent No.: US 11,480,100 B2
(45) Date of Patent: Oct. 25, 2022

(54) MACHINE WITH CONFIGURABLE POWER SYSTEM

(71) Applicant: Terex GB Limited, Dungannon (GB)

(72) Inventors: Adam Crankshaw, Omagh (GB); Lee Johnston, Lisbellaw (GB)

(73) Assignee: Terex GB Limited, Dungannon (GB)

( * ) Notice: Subject to any disclaimer, the term of this patent is extended or adjusted under 35 U.S.C. 154(b) by 10 days.

(21) Appl. No.: 17/022,735

(22) Filed: Sep. 16, 2020

(65) Prior Publication Data

US 2021/0079837 A1 Mar. 18, 2021

(51) Int. Cl.
| | | |
|---|---|---|
| F01D 15/10 | (2006.01) | |
| F02B 61/06 | (2006.01) | |
| F02B 63/04 | (2006.01) | |
| B02C 13/30 | (2006.01) | |

(52) U.S. Cl.
CPC ............. *F02B 61/06* (2013.01); *F02B 63/04* (2013.01); *B02C 13/30* (2013.01)

(58) Field of Classification Search
CPC ..... Y02T 10/62; Y02T 90/14; B60Y 2200/92; B60Y 2300/91; B60K 1/04; B60K 25/08; B60K 6/26; B60K 2006/4808; B60K 6/28; B60K 6/24; B60K 2006/4825; F02B 61/06; F02B 63/04
See application file for complete search history.

(56) References Cited

U.S. PATENT DOCUMENTS

| | | |
|---|---|---|
| 5,847,470 A | 12/1998 | Mitchell |
| 5,993,350 A | 11/1999 | Lawrie et al. |
| 9,193,273 B1 * | 11/2015 | Frank ................. H02J 3/322 |
| 2003/0230442 A1 | 12/2003 | Huang et al. |
| 2004/0043856 A1 * | 3/2004 | Xiaolan ............... F16H 3/728 475/5 |
| 2009/0212626 A1 * | 8/2009 | Snyder ............... B60L 50/61 307/10.1 |
| 2009/0236156 A1 | 9/2009 | Promersberger et al. |

(Continued)

FOREIGN PATENT DOCUMENTS

| | | |
|---|---|---|
| EP | 3251748 A1 | 12/2017 |
| WO | 2009017978 A1 | 2/2009 |
| WO | 2015020579 A1 | 2/2015 |

OTHER PUBLICATIONS

Search Report for Application GB1913482.4, dated Mar. 11, 2020, two pages.

(Continued)

*Primary Examiner* — George C Jin
*Assistant Examiner* — Teuta B Holbrook
(74) *Attorney, Agent, or Firm* — Warner Norcross + Judd LLP

(57) ABSTRACT

A machine such as a material processing apparatus comprises a mechanical transmission system coupled to a mechanical load such as a crusher. An internal combustion engine is coupled to the mechanical transmission system, and at least one motor-generator is coupled to an electrical system and to the mechanical transmission system. In at least one mode of operation, the electrical system delivers electrical power to the motor-generator(s), the motor-generator(s) generating mechanical power from the electrical power and delivering the mechanical power to the mechanical transmission system to drive the mechanical load.

19 Claims, 3 Drawing Sheets

(56) References Cited

U.S. PATENT DOCUMENTS

| | | | |
|---|---|---|---|
| 2010/0044129 A1 | 2/2010 | Kyle | |
| 2013/0221921 A1* | 8/2013 | Ang | B60L 7/14 |
| | | | 320/109 |
| 2013/0307456 A1* | 11/2013 | Ono | B60L 1/003 |
| | | | 318/453 |
| 2014/0316624 A1* | 10/2014 | Aoki | B60W 20/18 |
| | | | 701/22 |
| 2015/0163962 A1* | 6/2015 | Suzuki | H05K 1/0203 |
| | | | 361/699 |
| 2016/0036308 A1* | 2/2016 | Bailey | H02K 7/183 |
| | | | 290/45 |
| 2016/0264124 A1* | 9/2016 | Hotta | B60K 6/445 |
| 2016/0311304 A1* | 10/2016 | Niwa | B60W 10/06 |
| 2017/0001629 A1* | 1/2017 | Vyncke | B60W 10/10 |
| 2018/0154773 A1* | 6/2018 | Dalum | B60K 25/00 |
| 2018/0237023 A1* | 8/2018 | Orita | B60W 10/08 |
| 2019/0056026 A1* | 2/2019 | Dalum | F16N 7/00 |
| 2019/0059225 A1* | 2/2019 | Wallestad | A01D 46/085 |
| 2019/0077259 A1* | 3/2019 | Singh | B60K 6/383 |
| 2019/0233034 A1* | 8/2019 | Viele | B62D 49/007 |
| 2019/0296541 A1* | 9/2019 | Mensch | B60L 3/04 |

OTHER PUBLICATIONS

Search Report for Application EP20196166, dated Jul. 14, 2021, 11 pages.

\* cited by examiner

MACHINE WITH CONFIGURABLE POWER SYSTEM

FIELD OF THE INVENTION

The present invention relates to machines having power systems that include an internal combustion engine.

BACKGROUND TO THE INVENTION

Machines such as material processing apparatus conventionally include a diesel engine, an electrical system and a hydraulic system. The diesel engine may provide mechanical power to a main processing unit, for example a crusher, of the apparatus, and also to the wheels or tracks in cases where the apparatus is mobile. The diesel engine may power the electrical system via an alternator, and may also power the hydraulic system via a hydraulic pump and hydraulic motor.

For environmental reasons, it is desirable to reduce the use of internal combustion engines, and in particular diesel engines. However, because of the typical power requirements of some material processing apparatus, replacing the diesel engine with electrical motors, or using a conventional diesel-electric hybrid system, can be cost prohibitive and/or impractical.

It would be desirable to mitigate the problems outlined above.

SUMMARY OF THE INVENTION

A first aspect of the invention provides a machine comprising: a mechanical transmission system coupled to a mechanical load; an internal combustion engine coupled to the mechanical transmission system; an electrical system; at least one motor-generator coupled to the electrical system and to the mechanical transmission system, wherein, in at least one mode of operation, said electrical system is configured to deliver electrical power to said at least one motor-generator, said at least one motor-generator being configured to generate mechanical power from said electrical power and to deliver said mechanical power to the mechanical transmission system to drive said mechanical load.

In preferred embodiments, said electrical system is connectable to an external electricity supply, and wherein in at least one of said at least one mode of operation, said electrical system is configured to deliver electrical power from said external electricity supply to said at least one motor-generator. Preferably, said external electricity supply is a mains electricity supply.

Preferably, in at least one other mode of operation, said internal combustion engine is configured to deliver mechanical power to said at least one motor-generator via said mechanical transmission system, said at least one motor-generator being configured to generate electrical power from said mechanical power and to deliver said electrical power to the electrical system.

Optionally, in at least one of said at least one other mode of operation, said internal combustion engine delivers mechanical power to said mechanical load via said mechanical transmission system.

In preferred embodiments, the machine is operable in a first mode of operation in which said internal combustion engine delivers mechanical power to said mechanical load via said mechanical transmission system, and in which said internal combustion engine delivers mechanical power to said at least one motor-generator via said mechanical transmission system, and in which said at least one motor-generator generates electrical power from said mechanical power and delivers said electrical power to the electrical system. Optionally, the machine is mobile and comprises at least one wheel or track for conveying the machine along a ground surface, the electrical system comprising at least one electric motor for driving said at least one wheel or track, and wherein in said first mode of operation said electrical system is configured not to run said at least one electric motor.

Optionally the machine is mobile and comprises at least one wheel or track for conveying the machine along a ground surface, the electrical system comprising at least one electric motor for driving said at least one wheel or track, and wherein the machine is operable in a second mode of operation in which said internal combustion engine delivers mechanical power to said at least one motor-generator via said mechanical transmission system, said at least one motor-generator generating electrical power from said mechanical power and delivering said electrical power to said at least one electric motor. Preferably, in said second mode of operation said mechanical transmission system is configured not to supply mechanical power to said mechanical load.

Optionally, the machine is operable in a third mode in which said electrical system is connected to an external electricity supply and said electrical system delivers electrical power from said external electricity supply to said at least one motor-generator, said at least one motor-generator generating mechanical power from said electrical power delivering said mechanical power to the mechanical transmission system to drive said mechanical load. Optionally the machine is mobile and comprises at least one wheel or track for conveying the machine along a ground surface, the electrical system comprising at least one electric motor for driving said at least one wheel or track, and wherein in said third mode of operation said electrical system is configured not to run said at least one electric motor.

In typical embodiments, said at least one motor-generator comprises first and second motor-generators.

Typically, the electrical system includes an AC-AC electrical power conversion system, preferably an AC-DC-AC power conversion system, connected to said at least one motor-generator. In said at least one mode of operation, said power conversion system may be configured to convert AC electrical power received from an external electricity supply, preferably a mains electricity supply, to AC electrical power for said at least one motor-generator.

Optionally, in said at least one other mode of operation, said power conversion system is configured to convert AC electrical power generated by said at least one motor-generator to AC electrical power for said electrical system.

Said at least one motor-generator typically comprises more than one motor-generator, and said power conversion system may comprise a respective electrical power converter connected to each motor-generator.

In preferred embodiments, said power conversion system comprises an electrical power converter connected to a main circuit of said electrical system, said main circuit preferably being connectable to an external power supply.

In preferred embodiments, said power conversion system is an AC-DC-AC power conversion system comprising at least one AC-DC/DC-AC power converter connected to said at least one motor-generator, and an AC-DC/DC-AC power converter connected to a main circuit of said electrical system, and wherein the respective DC side of each converter are connected together.

Preferably said power conversion system is an AC-DC-AC power conversion system, and one or more battery is connected to the DC side of said power conversion system to provide electrical power to said DC side.

In preferred embodiments said machine is a material processing apparatus and said mechanical load comprises a material processing unit, for example a crusher.

Another aspect of the invention provides a material processing apparatus comprising: a mechanical 30 transmission system coupled to a mechanical load; an internal combustion engine coupled to the mechanical transmission system; an electrical system; at least one motor-generator coupled to the electrical system and to the mechanical transmission system, wherein, in at least one mode of operation, said electrical system is configured to deliver electrical power to said at least one motor-generator, said at least one motor-generator being configured to generate mechanical power from said electrical power 35 and to deliver said mechanical power to the mechanical transmission system to drive said mechanical load.

Other advantageous aspects and features of the invention will become apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
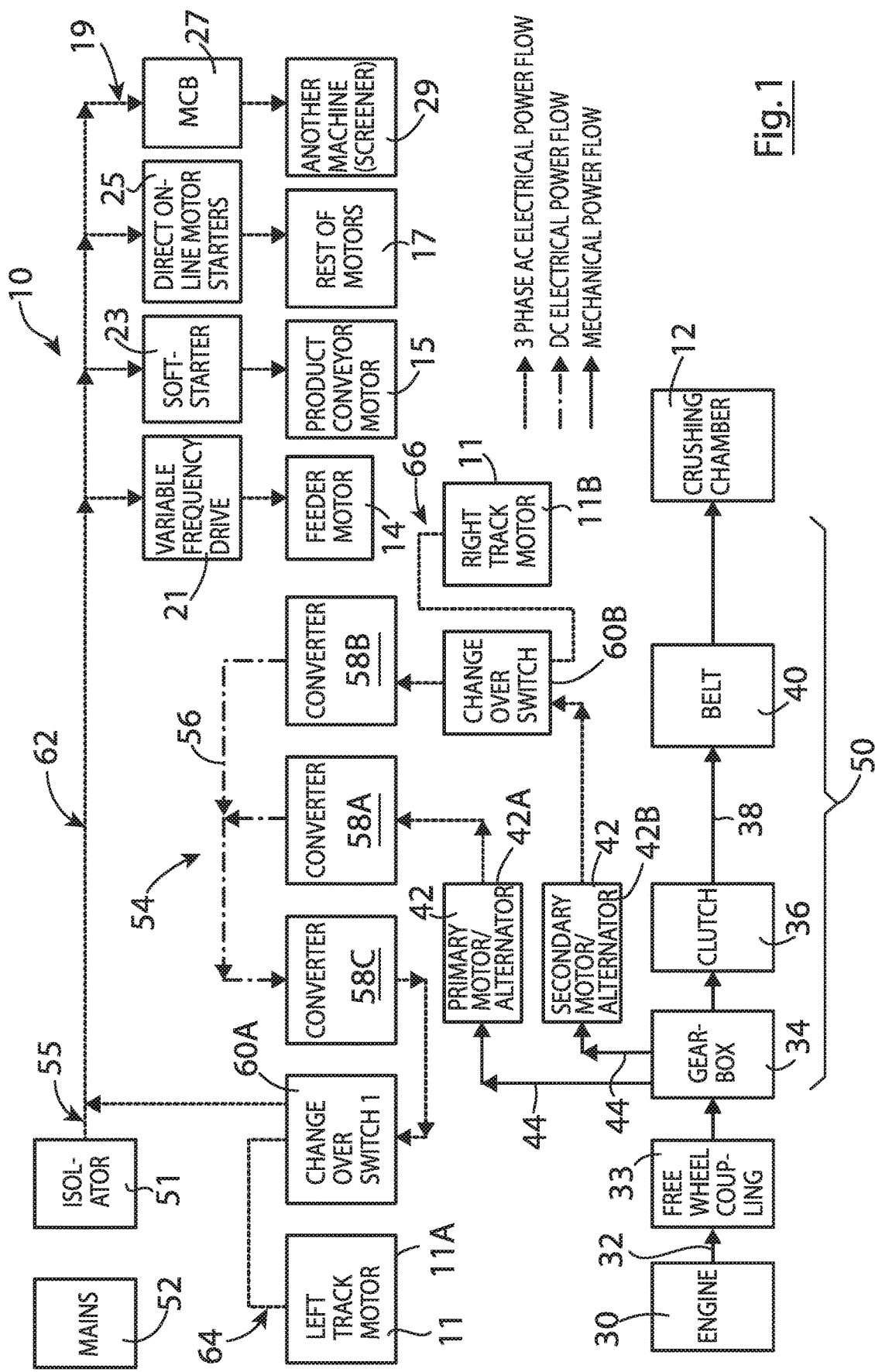
FIG. 1 is a block diagram of a material processing apparatus embodying one aspect of the invention, the apparatus being shown in a first mode of use.

Referring now to drawings there is shown, generally indicated as 10, a block diagram of a machine embodying the invention. Only those parts of the machine 10 that are helpful for understanding the present invention are shown. In particular, the drawings show electrical and mechanical components of the apparatus that are relevant to preferred embodiments of the invention.

In preferred embodiments, the machine 10 is a material processing apparatus. Depending on the 25 embodiment, the apparatus 10 may be configured to perform any one or more of a plurality of processes, such as feeding, conveying, screening, separating, crushing, breaking, recycling, shredding, demolition and/or washing, on one or more types of aggregate or other material, for example rocks, stones, gravel, sand and/or soil, or any other material, especially but not exclusively, material that is quarried, mined, excavated or requires breaking, recycling or sorting. To this end, the apparatus 10 typically includes a mechanically powered load comprising one or more material processing unit 12 configured to perform one or more of the foregoing processes. In the illustrated embodiment, the material processing unit 12 is a crusher, although it will be understood that the invention is not limited to crushers and may be employed with other types of material processing unit. Moreover, the invention is not limited to use with material processing apparatus and may be used with other machines with an internal combustion engine for driving one or more mechanically powered device, in particular machines in which the mechanically powered device(s) are used when the machine is stationary. Examples of other such machines include construction, mining, excavating, lifting, drilling and loading machines, e.g. an excavator or crane.

The main body of the apparatus 10 comprises a chassis (not shown) that carries the (or each) material processing unit 12. The chassis may also carry one or more other components that facilitate use of the processing unit 12, usually including a feeder unit (not shown) driven by a feeder motor 14 for delivering material to the material processing unit 12. The feed unit may take any conventional form, typically comprising a hopper and optionally a feed conveyor and/or a screen (not shown). Other powered components of the apparatus 10 may include one or more conveyors, each of which may be driven by one or more motor 15 (only one shown).

In typical embodiments, the apparatus 10 is mobile and comprises one or more wheels and/or tracks (not shown) mounted on the chassis for conveying the apparatus on a ground surface, each wheel or track being driven by one or more motor 11. However, in other embodiments (not illustrated), the apparatus 10 may be semi-mobile, for example comprising fixed or adjustable legs (and usually no wheels or tracks).

More generally, the apparatus 10 may include one or more motor that is part of any drive system or any actuation system of the apparatus 10. Such drive systems or actuation systems may be part of a material processing unit, e.g. a crusher or screen, or may be part of any other component, e.g. a conveyor or feeder. In the illustrated embodiment, in addition to the motors 11, 14, 15 for the tracks/wheels, feeder and conveyor, the apparatus 10 includes at least one other motor 17 for driving or actuating other components, e.g. pumps or foldable components. The motors 11, 14, 15, 17 may be of any conventional type, and in preferred embodiments are AC electrical motors (single phase or multi-phase as required), although they may alternatively be DC motors depending on the requirement of the embodiment.

Each motor 11, 14, 15, 17 may be connected to a motor driving device and/or a motor starter device. By way of example, in the illustrated embodiment, a variable frequency drive 21 is provided for controlling the feeder motor 14, a motor soft starter device 23 is provided for controlling the operation of the, or each, conveyor motor 15, and a direct on-line motor starter device 25 is provided for controlling the operation of the, or each, other motor 17. It will be understood that the invention is not limited to the configuration illustrated in the drawings and that other configurations of motors and ancillary devices may be used as suits the application.

The apparatus 10 includes an internal combustion engine 30, typically a diesel engine. The engine 30 may be mounted on the chassis in any conventional manner. The engine 30 has an output shaft 32 for delivering mechanical power to one or more components of the apparatus 10.

The apparatus includes a mechanical transmission system 50 for delivering mechanical power to a mechanical load comprising one or more components of the apparatus 10. In particular, the transmission system 50 is coupled to the material processing unit 12 in order to drive the material processing unit 12. In the illustrated embodiment, the material processing unit 12 is a crusher, for example a jaw crusher, but in alternative embodiments the transmission system 50 may be arranged to drive any other mechanical load, for example one or more conventional material processing unit(s) or other component(s) of the apparatus 10 as required.

In typical embodiments, the transmission system 50 comprises a gear system 34 coupled to a drive shaft 38, typically via a clutch 36. The drive shaft 38 is coupled to the material processing unit 12. In the illustrated embodiment, the coupling between the drive shaft 38 and the material processing unit 12 comprises a belt and pulley mechanism 40, but may alternatively be of any suitable conventional type. It will be understood that the invention is not limited to the illustrated transmission system 50 and that transmission systems having alternative compositions and configurations may be used as is convenient. The gear system 54 and clutch 36 may be of any suitable conventional type, and may be provided as a single unit, for example a clutch with integral gearing. By way of example, in some embodiments, the PT Tech HPTO 14 (trade mark) clutch may be used to provide the gear system 34 and the clutch 36.

The engine 30 is coupled to the transmission system 50 so that, in at least one mode of operation, the engine 30 provides mechanical power to the material processing unit 12 via the transmission system 50. In particular, the output shaft 32 is coupled to the transmission system 50, typically to the gear system 34. In preferred embodiments, the output shaft 32 is coupled to the transmission system 50, typically to the gear system 34, by a free-wheel coupling unit 33, for example a sprag clutch or other free-wheel clutch. The free-wheel coupling unit 33 allows rotational movement to be transmitted between the output shaft 32 and the transmission system 50 in one direction only (from the engine 30 to the transmission system 50), and does not transmit rotation in the opposite direction. In alternative embodiments the free-wheel coupling unit 33 may be replaced by any other suitable conventional clutch.

The apparatus 10 includes at least one motor-generator 42. In this context the term "motor-generator" is intended to mean a power transducer that can operate either as an electric motor or an electrical generator, i.e. converting electrical power into mechanical power, or vice versa. Each motor-generator 42 is mechanically coupled to the engine 30 so that, when acting as a generator, the motor-generator 42 converts mechanical power produced by the engine 30 into electrical power. Typically, the motor-generator 42 produces AC electrical power, preferably 3 phase AC electrical power, in this mode of operation and may therefore be said to comprise an alternator. In preferred embodiments, each motor-generator 42 is coupled to the gear system 34 by a respective drive shaft 44. In generator mode, the rotor (not shown) of each motor-generator 42 is driven by the respective shaft 44, which in turn is driven by the output shaft 32 of the engine 30 via the free-wheel coupler 33 and the gear system 34. In preferred embodiments, there are two motor-generators 42A, 42B, which may be designated as the primary motor-generator 42A and the secondary motor-generator 42B. The motor-generators 42A, 42B may be the same, or may be different, e.g. having different power ratings, as suits the application. In alternative embodiments, there may be only one motor-generator 42, or there may be more than two.

The apparatus 10 includes an electrical system for supplying electrical power to an electrical load typically comprising the electrically powered components of the apparatus 10 including, as applicable, electrically powered motors, such as motors 11, 14, 15, 17 in this example, and any associated electrically powered devices, such as the variable frequency drive 21 and starters 23, 25 in this example. The electrical system may also supply electrical power to any other electrically powered components of the apparatus 10, e.g. controllers and sensors. In preferred embodiments the electrical system includes an electrical power inlet 55 for connecting the electrical system to an external electrical power supply, for example a mains power supply 52, or an external generator (not shown) or other AC power supply. In alternative embodiments the apparatus 10 may be adapted for connection to a DC power supply such as a battery bank. The power inlet 55 may comprise any suitable electrical connector(s) (not shown). An electrical isolator 51 may be provided at the power inlet 55. Optionally, the electrical system may include one or more electrical power outlet 19 for connection to an external apparatus or device, for example another material processing apparatus 29, in order to supply electrical power thereto. The outlet 19 may include one or more circuit breaker 27 as required.

Each motor-generator 42 is connected to the electrical system such that it can supply electrical power to the electrical system when acting as a generator, and be supplied with electrical power from the electrical system when acting as a motor. In preferred embodiments, the electrical system includes an electrical power conversion system 54, typically connected between each motor-generator 42 and the rest of the electrical system, in particular the motors 11, 14, 15, 17 (and/or other electrical loads), the power inlet 55 and, when present, the power outlet 19. When the motor-generators 42 are acting as generators, the power conversion system 54 may be configured to change the voltage and/or frequency, as required, of the electrical power produced by the motor-generators 42 to suit the requirements of the electrical system, e.g. the electrical power requirements of the motors 11, 14, 15, 17. When the motor-generators 42 are acting as motors, the power conversion system 54 may be configured to supply AC power, preferably 3 phase AC power, to the motor-generators 42. In preferred embodiments, the power conversion system 54 is an AC-DC-AC type power conversion system, preferably operating on 3 phase electrical power. One of the AC sides of the conversion system 54 is connected to the main circuit of the electrical system, and the other AC side is connected to the motor-generators 42.

In cases where there is more than one motor-generator 42, the power conversion system 54 may be configured to convert the power produced by the motor-generators 42 from AC to DC outputs individually, e.g. by means of a respective power converter 58A, 58B, and to combine the respective DC outputs (in the DC side of the conversion system 54) and to convert the combined DC outputs into a combined AC output, e.g. by means of a suitable inverter, that suits the requirements of the electrical system. Conveniently the individual DC outputs can be combined using a common DC bus line 56 in the DC side of the conversion system 54.

In preferred embodiments, each motor-generator 42A, 42B is connected to a respective power converter 58A, 58B. The arrangement is such that, when the respective motor-generator 42A, 42B is acting as a generator, the respective power converter 58A, 58B converts the AC output of the motor-generator 42A, 42B to DC power, and when the respective motor-generator 42A, 42B is acting as a motor, the respective power converter 58A, 58B acts as an inverter to supply AC power to the respective motor generator 42A, 42B, and may convert the voltage and/or frequency as required. The preferred power conversion system 54 also includes a common power converter 58C which, in at least one mode of operation, receives DC power from the respective converter 58A, 58B (conveniently combined on DC bus line 56 in cases where there is more than one motor-generator 42) and converts same to AC power, preferably 3 phase AC power, and in at least one other mode of operation, receives AC power, preferably 3 phase AC power, and converts same to DC power that is supplied to each power converter 58A, 58B. Conveniently, DC is supplied between the common converter 58C and the converters 58A, 58B via bus line 56. In preferred embodiments, the converters 58A, 58B, 58C may comprise any suitable conventional circuitry for performing AC-DC and DC-AC power conversion as required.

The power conversion system 54 may be connected to the rest of the electrical system in any conventional manner such that, in at least one mode of operation, the power conversion system 54 is able to receive AC power, preferably 3 phase AC power, from the power inlet 55, and in at least one other mode of operation, the power conversion system 54 is able to supply AC power, preferably 3 phase AC power, to the rest of the electrical system, in particular to at least some of the motors 11, 14, 15, 17, and/or other electrical loads. In preferred embodiments, the common power converter 58C receives AC power from the power inlet 55 and converts same into DC power, and supplies AC power to the rest of the electrical system depending on the mode of operation.

One or more of the power converters 58A, 58B. 58C may be connected to a changeover switch 60A, 60B (typically at the AC side of the converter) configured to change where the output power of the converter 58A, 58B, 58C is directed to, and/or where the input power of the converter 58A, 58B, 58C is received from. In preferred embodiments, a changeover switch 60A is provided between the power conversion system 54 and the rest of the electrical system. In particular, the rest of the electrical system comprises a main circuit 62 that comprises at least some of the electrical load components (including the motors 14, 15, 17 in this example) and a second circuit 64 that comprises at least one other electrical load component, i.e. one of the track/wheel motors 11A in this example, and the changeover switch 60A is configurable to connect the power conversion system 54 either to the main circuit 62 or to the secondary circuit 64. When connected to the main circuit 62 the power conversion system 54 can supply AC power, preferably 3 phase AC power, to the main circuit 62, and when connected to the secondary circuit 64 the power conversion system 54 can provide AC power, preferably 3 phase AC power, to the secondary circuit 64. In preferred embodiments, the power inlet 55 is included in the main circuit 62 to allow the power conversion system 54 to receive AC power from the power inlet 55 depending on the setting of the switch 60A. In preferred embodiments, the switch 60A is connected to the AC side of the common converter 58C.

In preferred embodiments, a changeover switch 60B is provided at the AC side of the power converter 58B and is configurable so that the secondary motor-generator 42B may deliver AC power to or receive AC power, preferably 3 phase AC power, from the converter 58B, or that the converter 58B may deliver AC power, preferably 3 phase AC power, to a third circuit 66, that comprises at least one other electrical load component, i.e. the other of the track/wheel motors 11B in this example.

Referring now to FIG. 1 in particular, a first mode of operation of the apparatus 10 is described. In the first mode, the engine 30 drives the material processing unit 12 via the mechanical transmission system 50 and also provides electrical power for the electrical system via the motor-generators 42. In the preferred embodiment, the output shaft 32 of the engine 30 drives the gear system 34 via the coupling unit 33. The clutch 36 is engaged so that the gear system 34 drives the shaft 38 and pulley system 40 to drive the material processing unit 12. The gear system 34 also drives the rotor of the motor-generators 42 causing them to produce AC electrical power. The AC power from the primary motor-generator 42A is provided to the power converter 58A which converts it to DC power. The AC power from the secondary motor-generator 42B is provided to the power converter 58B (via suitable configuration of the changeover switch 60B in the illustrated embodiment) which converts the AC power into DC power. The DC power produced by each converter 58A, 58B is combined and provided to the common converter 58C which converts it to AC power. The AC power produced by the common converter 58C is provided to the main circuit 62 (via suitable configuration of the changeover switch 60A) in order to provide electrical power to the relevant components of the circuit 62, which in the illustrated embodiment comprise the motors 14, 15, 17 and associated components, but which in other embodiments may 30 comprise any other relevant electrical load component(s). Optionally, the AC power may also be provided to an external load via power outlet 19. In the illustrated embodiment in which the coupler 33 is a free-wheel unit, the coupler 33 transmits rotation of the shaft 32 to the gear system 34 in one direction only. The gear system 34 rotates the rotor of the motor-generators 42 in one direction only and rotates the drive shaft 38 in one direction only. In alternative embodiments the free-wheel coupler 33 may be replaced by a clutch that allows rotation of the shaft 32 to be transmitted to the gear system 34 in both rotational directions, and the shaft 38 may therefore also be rotated in both rotational directions. This can be advantageous in cases where the material processing unit 12 is a crusher, in particular a jaw crusher, since in can be desirable to drive the crusher in both rotational directions, e.g. to clear blockages. Typically, the apparatus 10 is stationary during the first mode and so the electrical system is configured not to run the motors 11A, 11B. This may be achieved by setting the switches 60A, 60B such that electrical power is not supplied to the motors 11A, 11B.

Figure 2:
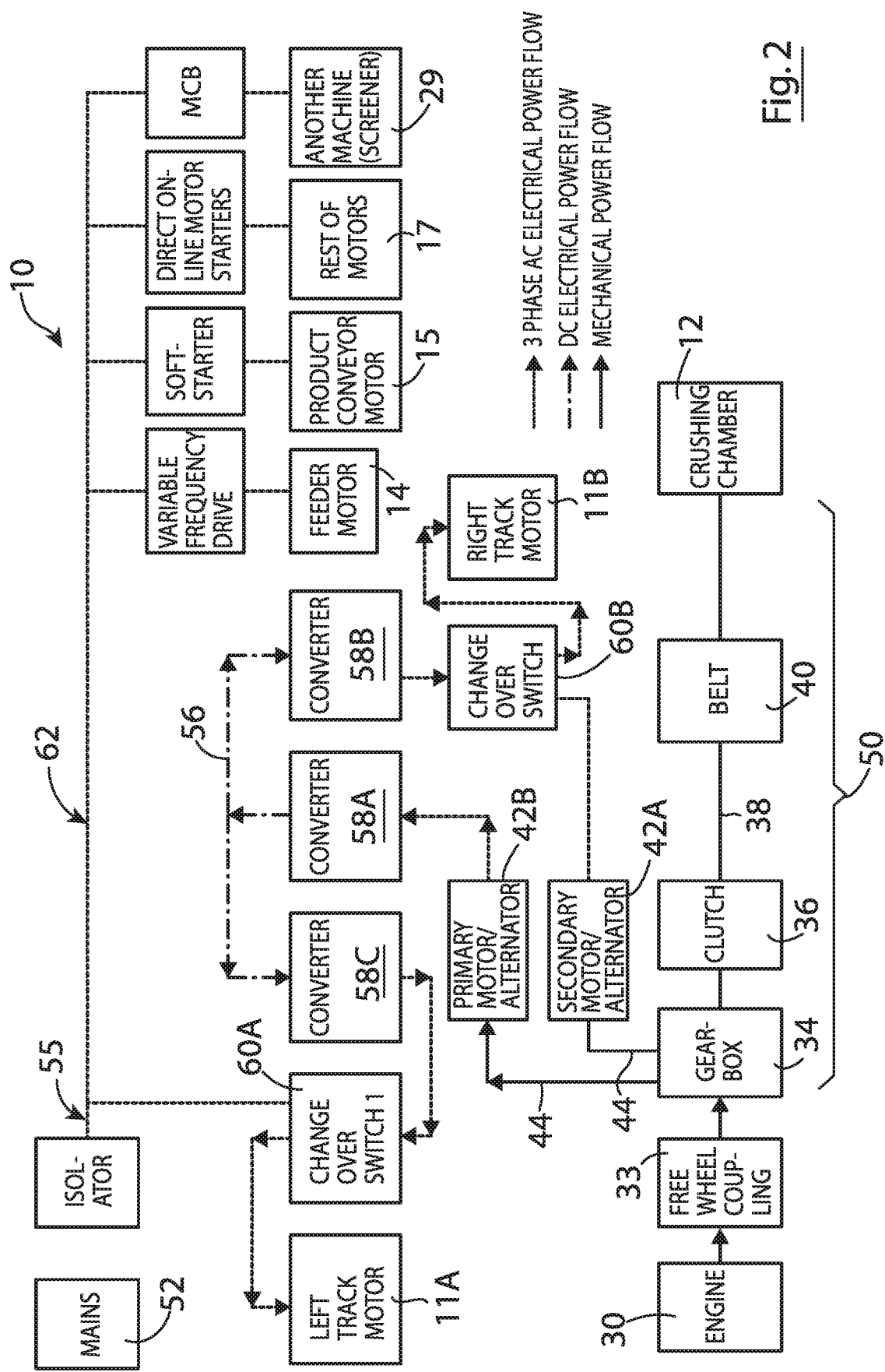
FIG. 2 is a block diagram of the material processing apparatus of FIG. 1 shown in a second mode of use.

Referring now to FIG. 2 in particular, a second mode of operation of the apparatus is described. In the second mode, the engine 30 drives the primary motor-generator 42A as described above for the first mode. As such, the primary motor-generator 42A provides AC power to the power converter 58A, which is converted to DC power and provided to the power converter 58C. However, in this mode, the changeover switch 60A is configured such that the AC power produced by the power converter 58C is supplied to the second circuit 62. Preferably, the second changeover switch 60B is configured so that the secondary motor-generator 42B does not provide power to the converter 58B (e.g. the switch 60B may isolate the secondary motor-generator 42B from the converter 58B); instead the configuration is such that the power converter 58B supplies AC power to the third circuit 66. The DC produced by the power converter 58A from the output of the primary motor-generator 42A is provided to the power 15 converter 58B and so converted into AC power that is supplied to the third circuit 66. The secondary motor-generator 42B may be disabled or isolated in any convenient manner in the second mode. In preferred embodiments, the second and third circuits 64, 66 comprise the respective electric motor 11A, 11B for driving a respective track or wheel of the apparatus 10. The speed and rotational direction of the motors 11A, 11B can be changed as required by the respective power converters 58C, 58B by suitable adjustment of the voltage and/or frequency of the produced AC power. In the preferred embodiment, the apparatus 10 travels during the second mode of operation and so typically the mechanical load is not driven and so the clutch 36 may be disengaged so that the drive shaft 38 is not driven. Similarly, the electrical load other than the motors 11A, 11B typically do not require electrical power and so the all of the electrical power produced by the motor-generator(s) 42 can be directed to the wheel/track motors 11. It is advantageous to drive the tracks/wheels using the electrically powered motors 11A, 11B as opposed to using the engine 30 and/or a hydraulic system as it reduces the amount of mechanical and/or hydraulic components that would otherwise be required.

It is noted that in the first and second modes, the engine 30 may provide all of the power for the apparatus 10 and the electrical system is not connected to an external power supply.

Figure 3:
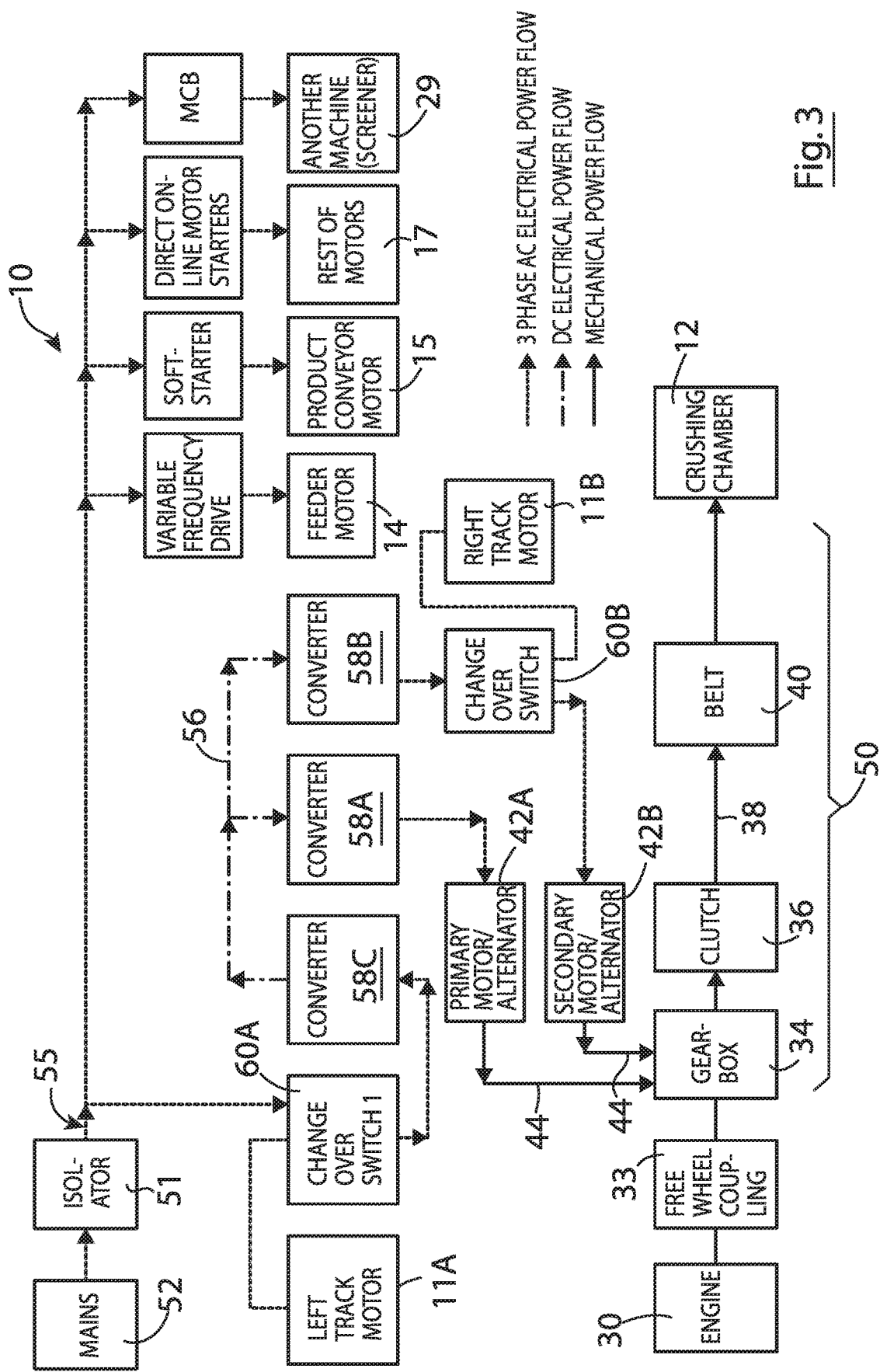
FIG. 3 is a block diagram of the material processing apparatus of FIG. 1 shown in a third mode of use.

Referring now in particular to FIG. 3, a third mode of operation of the apparatus 10 is described. In the third mode of operation, the electrical system is connected to an external power supply, typically a 3 phase AC mains supply, via power inlet 55. The external power supply is provided to the motor-35 generators 42, which act as motors and drive the mechanical transmission system 50 instead of the engine 30. The engine 30 may therefore be turned off. In particular, the motor-generators 42, acting as motors, provide mechanical power to the gear system 34 via rotation of the drive shafts 44. This mechanical power is transmitted to the drive shaft 38 via the clutch 36. Advantageously, the arrangement is such that the shafts 44 drive the gear system 34 in the same rotational direction as the shaft 32 of engine 30 does in the other modes of operation. Accordingly the material processing unit 12 is driven by the motor-generators 42 rather than by the engine 30. In the preferred embodiment, the freewheel configuration of the coupling unit 33 prevents the rotation of the shafts 44 from being transmitted to the output shaft 32 of the engine 30. In alternative embodiments, any other suitable clutch may be provided for ensuring that the rotation of the shafts 44 is not transmitted to the output shaft 32.

In some embodiments, the primary motor-generator 42A and secondary motor generator 42B are mechanically coupled to an input shaft gear (not shown) of the gear system 34 and, as such, drive the 10 gear system 34 in the same rotational direction as the shaft 32 of engine 30 does in the other modes of operation. Alternatively, one or other or both of the primary motor-generator 42A and secondary motor generator 42B may be mechanically coupled to the output shaft of the clutch 36 in order to drive the processing unit 12. This configuration allows the, or each, relevant motor-generator 42A, 42B to drive the processing unit in either rotational direction (in particular when the clutch 36 is disengaged in the illustrated embodiment). This arrangement is advantageous in cases where the processing unit 12 is of a type, e.g. a jaw crusher, that can be driven in opposite rotational directions.

In the third mode, the external power supply may also provide electrical power to the main circuit 62, and therefore to all components or systems connected thereto, including the motors 14, 15, 17 and any external machine connected to the outlet 19, as applicable. In the illustrated embodiment the changeover switch 60A is configured so that the AC power received at the power inlet 55 is provided to the power conversion system 54, in particular to the AC side of the common power converter 58C. The power conversion system 54 is configured to provide AC power to the motor-generators 42 via the respective power converters 58A, 58B. In the illustrated embodiment, the changeover switch 60B is configured to provide AC power from the power converter 58B to the motor-generator 42B. Advantageously, the power converters 58A, 58B can control the rotational speed and torque of the shafts 44 by adjusting the voltage and/or frequency of the AC power that they provide to the motor-generators 42. This allows the clutch 36 to be engaged a relatively low speeds. The material processing apparatus 12 may be driven and any desired speed, via the clutch 36, by appropriate adjustment of the voltage and/or frequency of the AC power provided by the power converters 58A, 58B. Typically, the apparatus 10 is stationary during the third mode and so the electrical system is configured not to run the motors 11A, 11B. This may be achieved by setting the switches 60A, 60B such that electrical power is not supplied to the motors 11A, 11B.

Optionally, one or more additional power converters (not shown) may be provided between the main circuit 62 and the DC bus line so that, in the third mode, additional power may be made available to the motor-generators 42 if required.

In comparison with prior art apparatus, preferred embodiments of the invention are advantageous in that a relatively large alternator coupled to the engine is not required; a relatively large circuit breaker between the alternator and a switch gear panel is not required; a relatively large electric motor to drive the mechanical load is not required; a relatively large variable speed drive (VSD) to drive the load is not required, and large bypass contacts to bypass the VSD when it overheats are not required; a relatively large motor/pump drive to power the wheels/tracks is not required.

Advantageously, preferred embodiments obviate the need for a hydraulic system which is commonly present in conventional material processing apparatus, or at least reduce the requirements of a hydraulic system.

In alternative embodiments, the apparatus 10 need not support each of the first, second and third modes of operation described above. For example, only modes two and three may be supported, which allows a reduced size engine to be provided since it is not required to drive the mechanical load. Embodiments of the invention may support one or more modes of operation other than said first, second and third modes.

For example, the apparatus 10 may include one or more batteries (not shown), for example connected to DC bus line 56, for powering one or more of the electrical components of the apparatus 10. The batteries allow the apparatus 10 to support a mode of operation (which may for example be supported instead of the second mode described above) in which the motors 11A, 11B for driving the wheels/tracks are powered by the batteries instead of by the motor-generator 42A.

Optionally, one or more batteries (not shown) may be included in or connected to the DC side of the power conversion system 54, for example connected to DC bus line 56, in order to supplement the power produced by the conversion system 54 at either one or both of its AC sides. The batteries allow the apparatus 10 to support modes of operation in which electrical power is supplied to one or more of the electrical components from the batteries rather than from the mains and/or rather than from the motor-generators.

The apparatus 10 includes a control system (not shown) for controlling the operation of the apparatus as described above. The control system may be of any conventional type and configuration, e.g. comprising a PLC, microprocessor, microcontroller or other controller and one or more user control device, e.g. a control panel or other input device as is convenient. In the illustrated embodiment, control of the apparatus 10 involves controlling the state of the switches 60A, 60B and controlling the operation of the converters 58A, 58B, 58C as applicable, In particular, whether each motor-generator 42A, 42B is operating in motor mode or generator mode may be effected by controlling the operation of the converters 58A, 58B.

Conveniently, the motor-generators 42A, 42B may be conventional units, for example Danfoss Editron (trade mark) electric drivetrains. Conveniently the converters 58A, 58B, 58C may be conventional units, for example Danfoss Editron (trade mark) electric converters.

The invention is not limited to the embodiment(s) described herein but can be amended or modified without departing from the scope of the present invention.

The invention claimed is:

1. A machine comprising:
   a mechanical transmission system coupled to a mechanical load;
   an internal combustion engine coupled to the mechanical transmission system;
   an electrical system;
   at least one motor-generator coupled to the electrical system and to the mechanical transmission system,
   wherein, in at least one mode of operation, said electrical system is configured to deliver electrical power to said at least one motor-generator, said at least one motor-generator being configured to generate mechanical power from said electrical power and to deliver said mechanical power to the mechanical transmission system to drive said mechanical load,
   and wherein said at least one mode of operation includes a mode in which said electrical system is connected to an external electricity supply and said electrical system delivers electrical power from said external electricity supply to said at least one motor-generator, said at least one motor-generator generating mechanical power from said electrical power and delivering said mechanical power to the mechanical transmission system to drive said mechanical load.

2. The machine of claim 1, wherein said electrical system is connectable to an external electricity supply, and wherein in at least one of said at least one mode of operation, said electrical system is configured to deliver electrical power from said external electricity supply to said at least one motor-generator.

3. The machine of claim 2, wherein said external electricity supply is a mains electricity supply.

4. The machine of claim 1, wherein, in at least one other mode of operation, said internal combustion engine is configured to deliver mechanical power to said at least one motor-generator via said mechanical transmission system, said at least one motor-generator being configured to generate electrical power from said mechanical power and to deliver said electrical power to the electrical system.

5. The machine of claim 1, wherein in at least one of said at least one other mode of operation, said internal combustion engine delivers mechanical power to said mechanical load via said mechanical transmission system.

6. The machine of claim 1, the machine being operable in a first mode of operation in which said internal combustion engine delivers mechanical power to said mechanical load via said mechanical transmission system, and in which said internal combustion engine delivers mechanical power to said at least one motor-generator via said mechanical transmission system, and in which said at least one motor-generator generates electrical power from said mechanical power and delivers said electrical power to the electrical system.

7. The machine of claim 6, wherein the machine is mobile and comprises at least one wheel or track for conveying the machine along a ground surface, the electrical system comprising at least one electric motor for driving said at least one wheel or track, and wherein in said first mode of operation said electrical system is configured not to run said at least one electric motor.

8. The machine of claim 1, wherein the machine is mobile and comprises at least one wheel or track for conveying the machine along a ground surface, the electrical system comprising at least one electric motor for driving said at least one wheel or track, and wherein the machine is operable in a second mode of operation in which said internal combustion engine delivers mechanical power to said at least one motor-generator via said mechanical transmission system, said at least one motor-generator generating electrical power from said mechanical power and delivering said electrical power to said at least one electric motor.

9. The machine of claim 8, wherein in said second mode of operation said mechanical transmission system is configured not to supply mechanical power to said mechanical load.

10. The machine of claim 1, wherein the machine is mobile and comprises at least one wheel or track for conveying the machine along a ground surface, the electrical system comprising at least one electric motor for driving said at least one wheel or track, and wherein in said mode of operation in which said electrical system is connected to an external electricity supply said electrical system is configured not to run said at least one electric motor.

11. The machine of claim 1, wherein said at least one motor-generator comprises first and second motor-generators.

12. The machine of claim 1, wherein the electrical system includes an AC-AC electrical power conversion system, preferably an AC-DC-AC power conversion system, connected to said at least one motor-generator.

13. The machine of claim 12, wherein in said at least one mode of operation, said power conversion system is configured to convert AC electrical power received from an external electricity supply, preferably a mains electricity supply, to AC electrical power for said at least one motor-generator.

14. The machine of claim 12, wherein, in at least one other mode of operation, said internal combustion engine is configured to deliver mechanical power to said at least one motor-generator via said mechanical transmission system, said at least one motor-generator being configured to generate electrical power from said mechanical power and to deliver said electrical power to the electrical system, and wherein in said at least one other mode of operation, said power conversion system is configured to convert AC electrical power generated by said at least one motor-generator to AC electrical power for said electrical system.

15. The machine of claim 12, wherein said at least one motor-generator comprises more than one motor-generator, and wherein said power conversion system comprises a respective electrical power converter connected to each motor-generator.

16. The machine of claim 12, wherein said power conversion system comprises an electrical power converter connected to a main circuit of said electrical system, said main circuit preferably being connectable to an external power supply.

17. The machine of claim 12, wherein said power conversion system is an AC-DC-AC power conversion system comprising at least one AC-DC/DC-AC power converter connected to said at least one motor-generator, and an AC-DC/DC-AC power converter connected to a main circuit of said electrical system, and wherein the respective DC side of each converter are connected together.

18. The machine of claim 12, wherein said power conversion system is an AC-DC-AC power conversion system, and wherein one or more battery is connected to the DC side of said power conversion system to provide electrical power to said DC side.

19. A material processing apparatus comprising:
   a mechanical transmission system coupled to a material processing unit;
   an internal combustion engine coupled to the mechanical transmission system;
   an electrical system;
   at least one motor-generator coupled to the electrical system and to the mechanical transmission system,
   wherein, in at least one mode of operation, said electrical system is configured to deliver electrical power to said at least one motor-generator, said at least one motor-generator being configured to generate mechanical power from said electrical power and to deliver said mechanical power to the mechanical transmission system to drive said material processing unit,
   and wherein said at least one mode of operation includes a mode in which said electrical system is connected to an external electricity supply and said electrical system delivers electrical power from said external electricity supply to said at least one motor-generator, said at least one motor-generator generating mechanical power from said electrical power and delivering said mechanical power to the mechanical transmission system to drive said material processing unit.

\* \* \* \* \*